Figure 4:
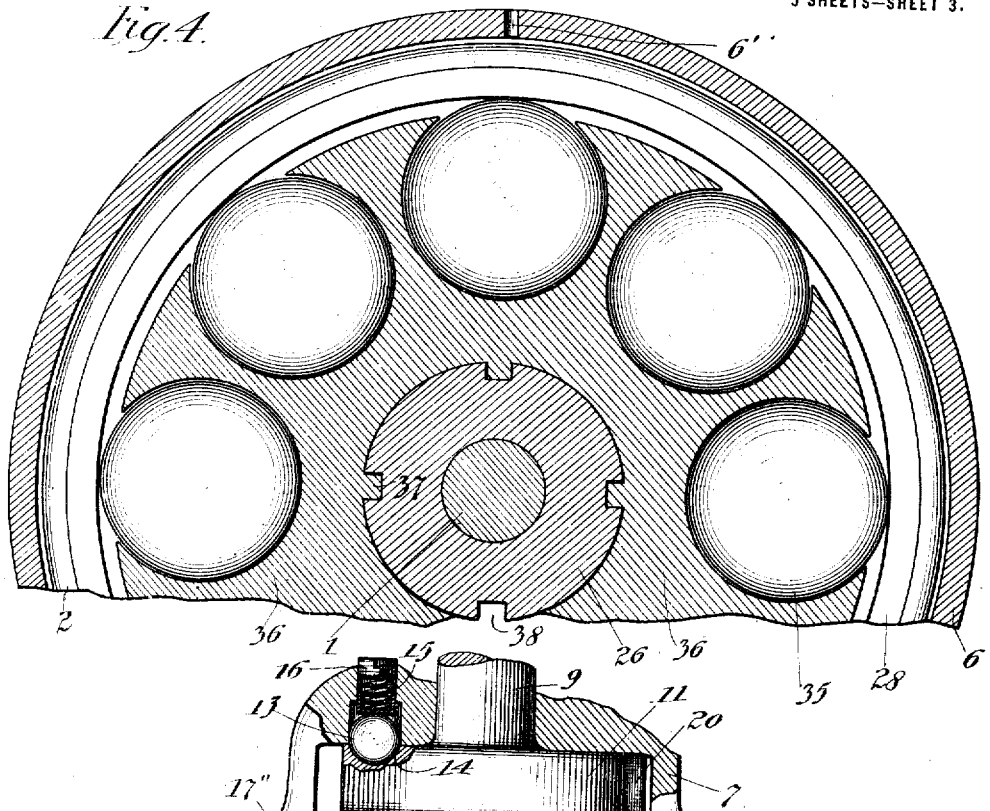

W. C. SMITH.
BALL TRANSMISSION MECHANISM.
APPLICATION FILED DEC. 27, 1915.
1,202,910.
Patented Oct. 31, 1916.
5 SHEETS—SHEET 1.
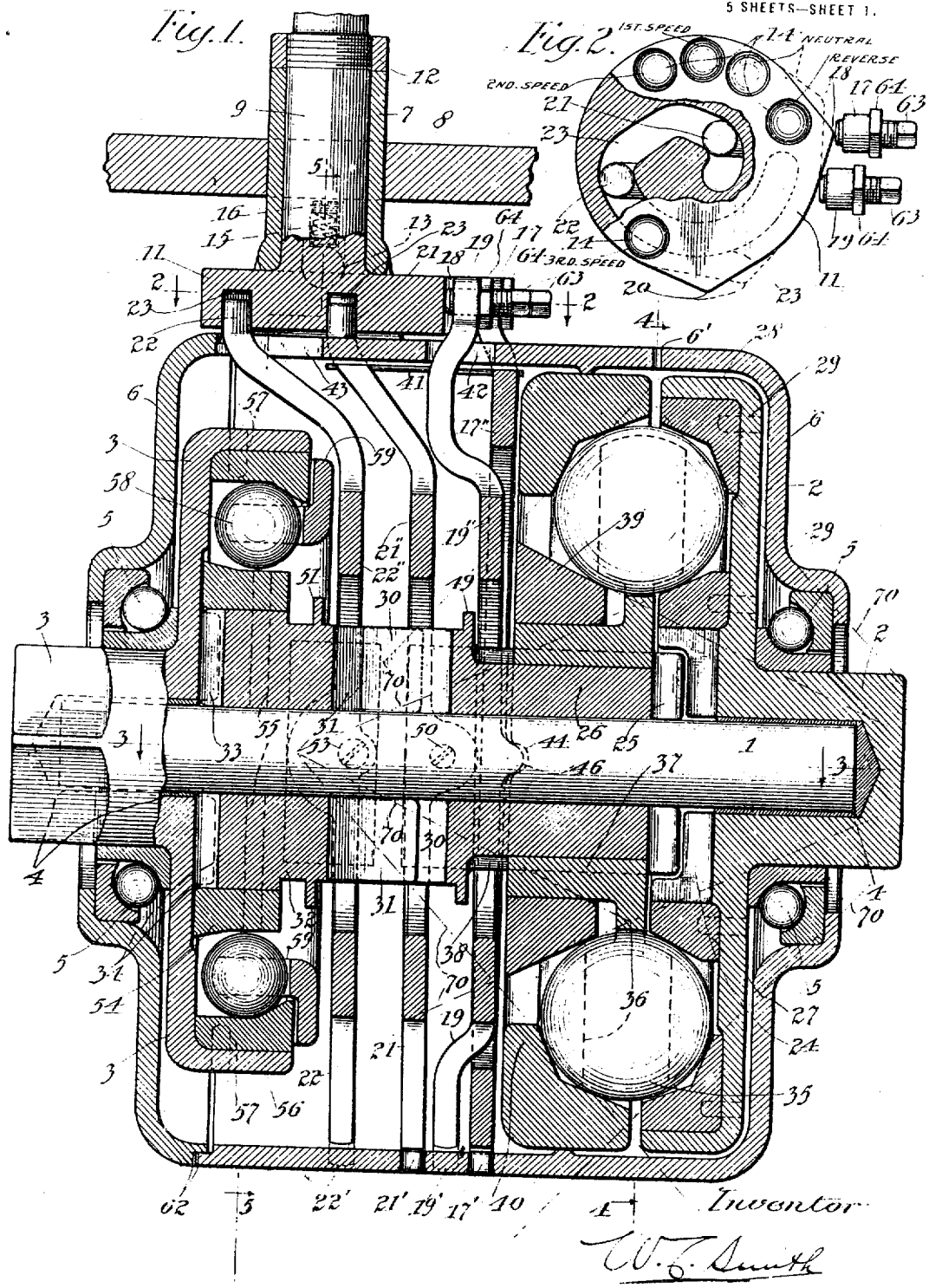

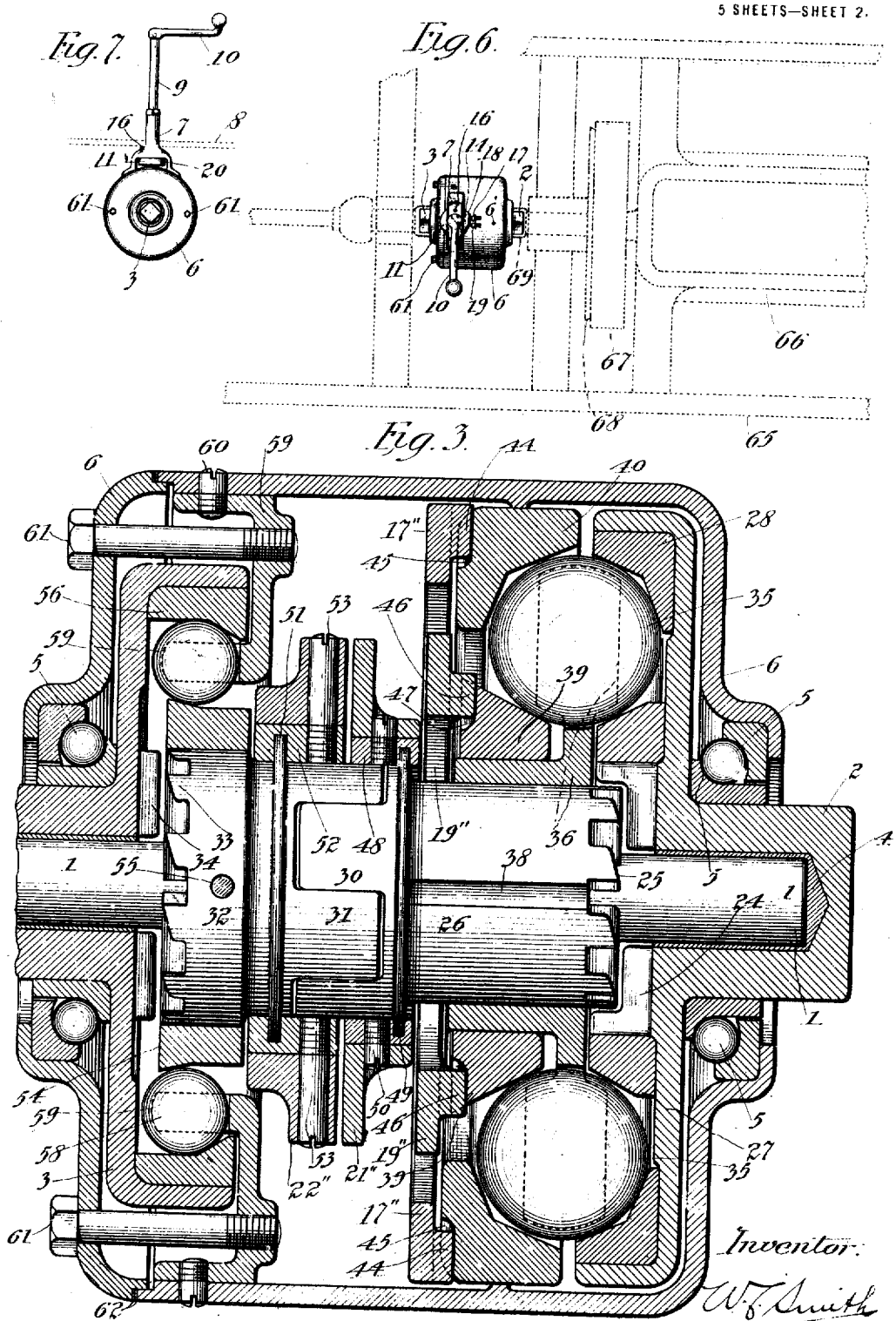

W. C. SMITH.
BALL TRANSMISSION MECHANISM.
APPLICATION FILED DEC. 27, 1915.

1,202,910.

Patented Oct. 31, 1916.
5 SHEETS—SHEET 3.

Inventor:
W. C. Smith

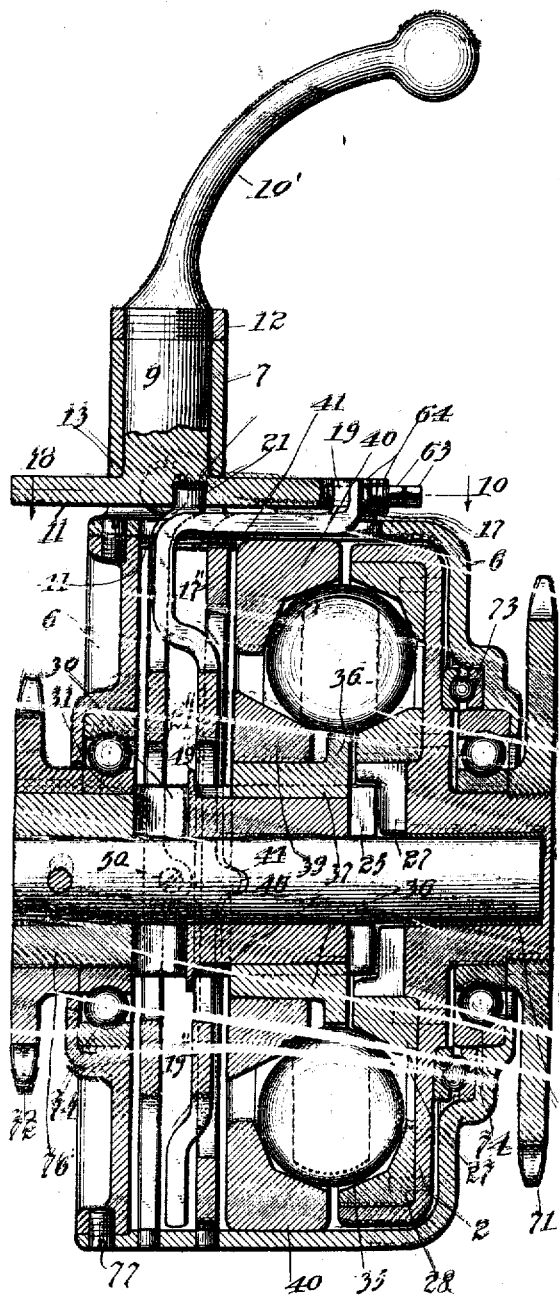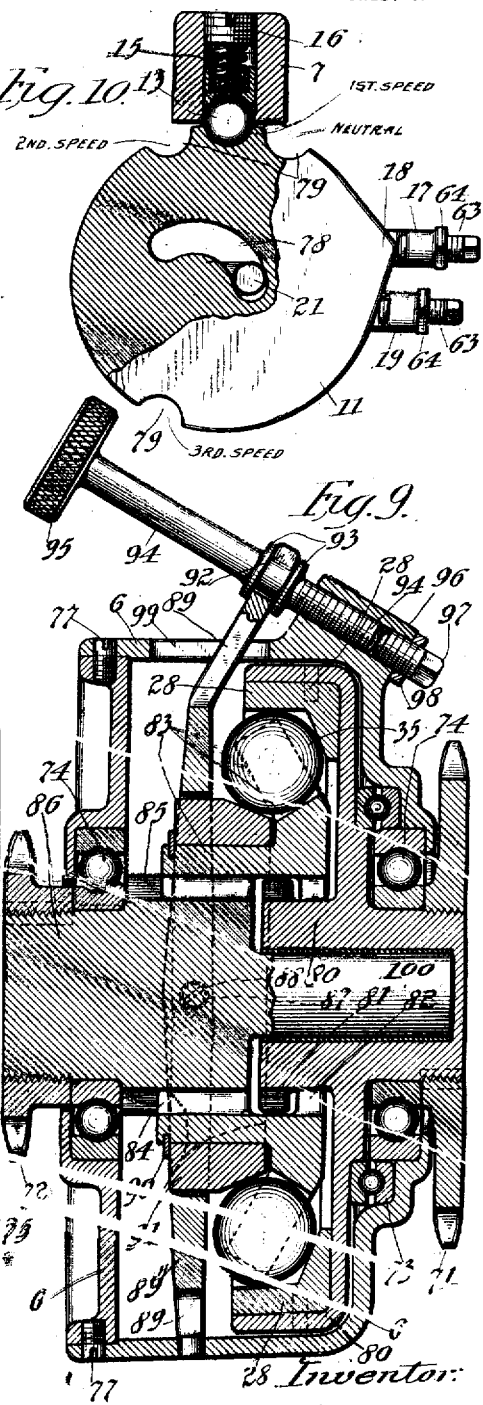

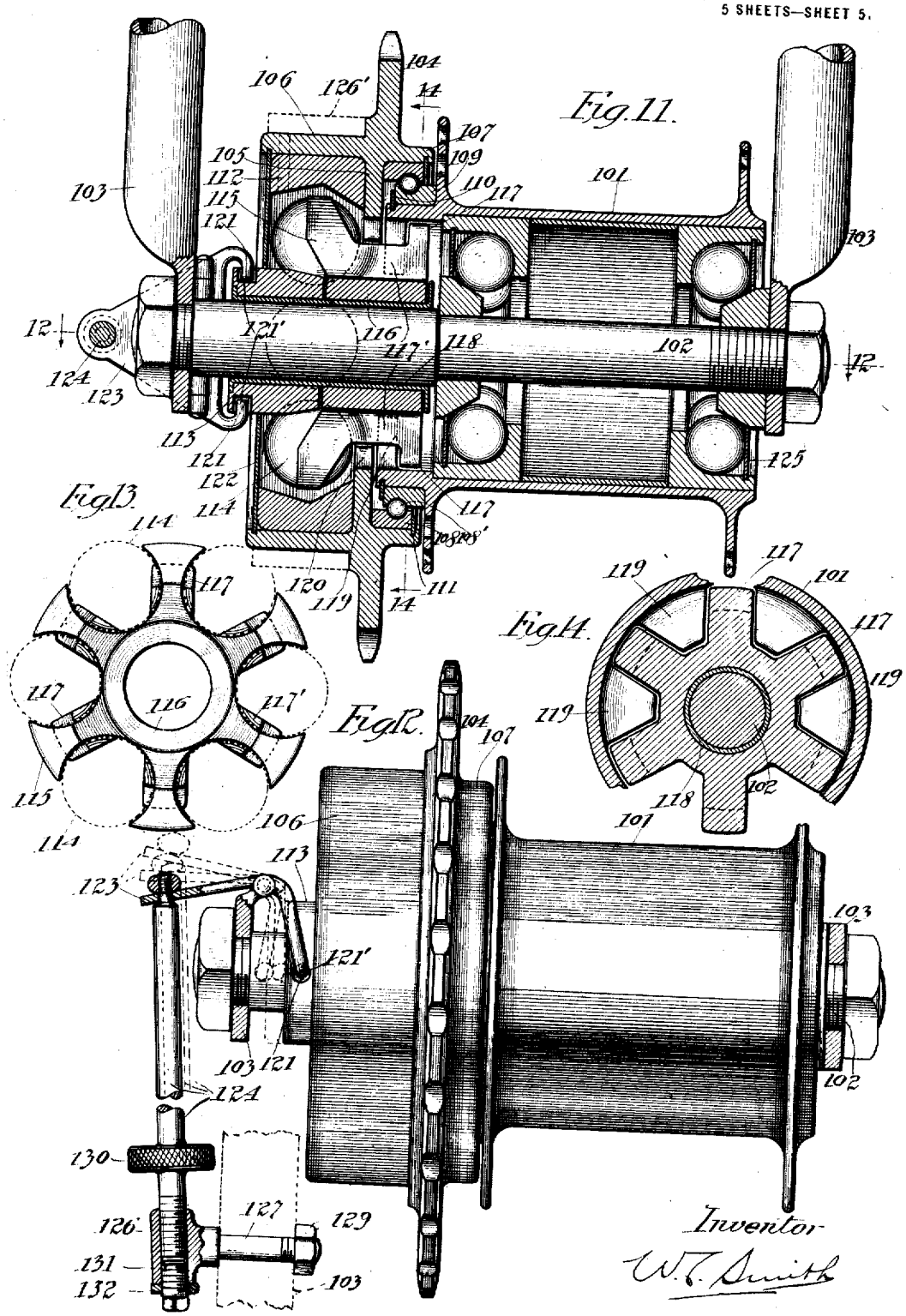

UNITED STATES PATENT OFFICE.

WILLIAM COBB SMITH, OF CHICAGO, ILLINOIS.

BALL TRANSMISSION MECHANISM.

1,202,910.  Specification of Letters Patent.  Patented Oct. 31, 1916.

Application filed December 27, 1915. Serial No. 68,837.

*To all whom it may concern:*

Be it known that I, WILLIAM COBB SMITH, a citizen of the United States, residing at Chicago, in the county of Cook and State of Illinois, have invented a new and useful Ball Transmission Mechanism, of which the following is a full, clear, and exact description.

My invention relates to a ball transmission mechanism for automobiles and motor-cycles, an object being to provide a simple and durable gearless transmission mechanism which shall be silent and highly efficient in operation.

The main object of my invention broadly stated is to provide a ball transmission mechanism with means for maintaining the balls normally idle or floating in their operative relation to the driven member, so that when a low speed is desired the balls may be forced into rolling contact with the driving member.

A further object of my invention more specifically stated is to provide a ball transmission with means for maintaining the balls normally idle or floating in their operative relation to the driven member, and means for forcing the balls into rolling contact with the driving member for producing a speed lower than high speed.

A further object is to provide a ball transmission mechanism having a row of normally idle balls loosely inserted in the driven member, with concentric raceways carried by the driving member, and controllable means for successively forcing said balls into contact with said raceways for producing different low speeds.

A further object is to provide a ball transmission mechanism having a row of normally idle balls in operative relation with a driven member, with a reverse driving raceway connected with said member, and controlling mechanism adapted to force said balls into contact with a driving raceway and said reverse driving raceway into contact with a second row of normally idle balls, which are so mounted as to impart a reverse movement to a final driven member.

A further object is to provide an automobile transmission mechanism having three forward speeds and a reverse which is capable of changes in design for producing the various speed ratios in common use. And a further object is to provide suitable two and three speed designs for motor-cycles and cycle-cars.

Other objects will appear hereinafter.

With these objects in view, my invention consists in the novel construction, combination and arrangement of parts all as will be described hereinafter, and more particularly pointed out in the appended claims.

The invention will be readily understood by reference to the accompanying drawings forming a part of this specification and in which—

Figure 5:
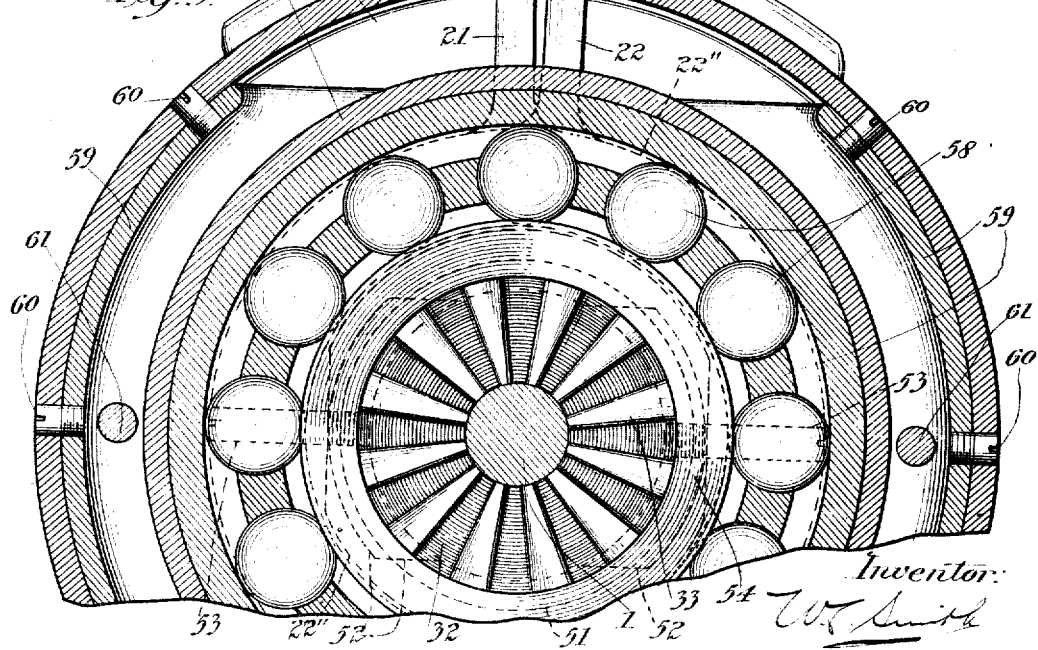

Figure 1 is a vertical longitudinal section of a 3-speed and reverse transmission mechanism designed for automobile use. Fig. 2 is a detail plan section taken on line 2—2, of Fig. 1. Fig. 3 is a plan section of the transmission mechanism taken on line 3—3 of Fig. 1. Figs. 4 and 5 are transverse sections taken on lines 4—4, and 5—5 of Fig. 1, respectively. Fig. 6 is a top plan view of the transmission mechanism and showing by dotted lines the general location thereof in an automobile chassis. Fig. 7 is an end elevation of the transmission mechanism. Fig. 8 is a vertical longitudinal section of a 3-speed transmission mechanism embodying my invention, and designed for motor-cycle use. Fig. 9 is a vertical longitudinal section of a 2-speed motor-cycle transmission mechanism embodying my invention, and showing a modified form of control. Fig. 10 is a detail plan section taken on line 10—10 of Fig. 8. Fig. 11 is a vertical longitudinal section showing an embodiment of my invention in the rear hub of a motor-cycle. Fig. 12 is a top plan view of said hub, certain parts being in plan section on line 12—12 of Fig. 11. Fig. 13 is an end elevation of a ball separator, and Fig. 14 is a transverse section taken on line 14—14 of Fig. 11.

The preferred form of construction for carrying my invention into effect comprises a central floating shaft 1, one end of which is journaled in a driving member 2 and the other in a driven member 3, bushings 4 being provided in said members to alleviate friction. Said members are mounted by means of ball bearings 5 in a two-part stationary casing 6 which is held against rotation by means of a control shaft bracket 7 projecting upwardly from the top of said casing through the floor 8 of the automobile, as shown in Figs. 1 and 7. A control shaft 9 journaled in bracket 7 is provided at the upper end thereof with an operating lever 10, and at the lower end with a recessed disk 11, said shaft being held in operative position by means of a retaining collar 12 secured thereto, as shown in Fig. 1. A ball 13 is mounted in the bracket 7 to coöperate with recesses 14 of the disk 11 for automatically locking the latter in the various speed positions, as indicated in Fig. 2. The ball 13 is actuated by a helical spring 15, the tension of which is regulated by means of an adjusting screw 16, as shown in Fig. 5.

The first-speed shift lever 17 is actuated by means of a cam 18 formed on the periphery of disk 11, the second-speed shift lever 19 by means of said cam 18 and a similar cam 20, and the high or third-speed shift lever 21 and the reverse shift lever 22 by means of a C-shaped cam groove 23 formed in said disk 11.

The inner face of driving member 2 is provided with teeth 24 for engagement with similar teeth 25 of the high speed clutch 26, and with concentric driving ball raceways 27 and 28 which are held in position by pins 29, as indicated by dotted lines in Fig. 1. The high speed clutch 26 is provided with teeth 30 which are in permanent engagement with teeth 31 formed on one end of the reverse clutch 32, the other end of the reverse clutch having teeth 33 which are adapted to engage and disengage teeth 34 of driven member 3. Balls 35 adapted to roll on either of said raceways are spaced by means of a separator 36 which is provided with internal splines 37 fitted to longitudinal grooves 38 formed in the periphery of the high speed clutch 26. The latter is thus permitted to slide on the shaft 1 without moving the separator 36. The balls 35 are also adapted to roll on either of two concentric non-rotatable raceways 39 and 40, the former being slidably mounted on separator 36 for engaging or disengaging said balls and the latter being slidably mounted within casing 6, as shown in Fig. 1. The construction is such that when the first-speed raceways 27 and 40 are operatively engaged with balls 35, the second-speed raceways 28 and 39 are disengaged therefrom, and vice versa.

The high speed shift lever 21 and the first-speed shift lever 17 project through a guide slot 41 formed in casing 6, and the second-speed shift lever 19 and the reverse shift lever 22 project through slots 42 and 43, respectively. The levers 17, 19, 21 and 22 are provided with rounded ends 17', 19', 21' and 22', respectively, which are pivoted in casing 6 at points opposite said slots, as shown in Fig. 1. Intermediate their ends levers 17, 19, 21 and 22 are provided with annular portions 17'', 19'', 21'' and 22'', respectively, the portion 17'' having diametrically opposite teeth 44 which engage recesses 45 formed in raceway 40, as shown in Fig. 3. Teeth 46, similar to teeth 44, are provided on the annular portion 19'' for engagement with recesses 47 formed in the raceway 39. In this manner, raceways 40 and 39 are held against rotation. It will be seen that the teeth 44 and 46 are disposed in a plane at right angles to the general direction of the levers of which they form a part, the result being that pressure applied to raceways 39 and 40 through the medium of teeth 44 and 46 will be distributed uniformly to balls 35, thus permitting the latter to carry very heavy loads without danger of deteriorating the contact surfaces.

In order to slide the high speed clutch 26 into and out of engagement with driving member 2, grooved collar blocks 48 are provided which are fitted to a collar 49 formed on the periphery of said clutch, there being diametrically opposite screws 50 which form a pivotal connection between said blocks and the annular portion 21'' of lever 21, as shown in Figs. 1 and 3. A similar connection is provided for reverse shift lever 22, there being a peripheral collar 51 on the reverse clutch 32 on which is fitted collar blocks 52 from which project diametrically opposite screws 53 passing through the annular portion 22'' of lever 22, as shown in Figs. 1, 3 and 5.

The reversing means comprises a driving ball raceway 54, which is secured to the reverse clutch 32 by means of pins 55, and a driven raceway 56 secured to driven member 3 by means of pins 57, as indicated by dotted lines in Fig. 1. These raceways are concentric and balls 58 are interposed therebetween, as shown in Figs. 1 and 3. The balls 58 are spaced by means of a stationary separator 59 which is secured in casing 6 by means of a plurality of screws 60. The construction is such that when teeth 33 mesh with teeth 34 raceway 54 is out of operative engagement with balls 58, but when the reverse clutch 32 is moved into the position as shown in Fig. 3, operative engagement with said balls is effected, which transmit a reverse motion to member 3.

The two parts of casing 6 are held together by means of cap-screws 61 which are passed through one end of the casing and secured in the separator 59, as shown in Fig. 3. Removable shims 62 are provided in the joint between the two parts of casing 6 in order to take up the wear of ball-bearings 5. Adjustable cam contacting screws 63 and lock-nuts 64 are provided at the upper ends of the slightly flexible shift levers 17 and 19 in order that the pressure which is brought to bear on balls 35 may be properly regulated by the operator. An oil-hole 6' may be provided in the casing 6, as shown in Fig. 1, or an oil-duct may be connected at this point, if desired.

In the automobile chassis, as indicated by dotted lines in Fig. 6, 65 designates the frame, 66 the motor, 67 the fly-wheel and 68 the clutch, the driving member 2 of the transmission mechanism being driven by clutch-shaft 69. Since it is essential that balls 35 have true rolling contact on the raceways 27, 28, 39 and 40, the latter are so formed that the contacting points thereof lie in converging lines 70, as indicated in Fig. 1.

The operation of the transmission mechanism is as follows: Assuming that operating lever 10 and cam disk 11 are in neutral, as shown in Fig. 6, and that raceways 39 and 40 are out of operative engagement with balls 35, then a slight clockwise movement of lever 10 will bring cam 18 into first-speed position which is locked automatically by the ball 13. When the clutch 68 is let in by the operator, the raceway 27 will actuate balls 35 so that a speed of approximately one-third that of member 2 will be imparted to member 3 through the medium of separator 36 and clutches 26 and 32. A further clockwise movement of lever 10 will effect the disengagement of first speed and engagement of second-speed, which is also locked by ball 13. The driving in this case is done by raceway 28, which obviously moves faster than the raceway 27. A speed approximately two-thirds that of member 2 will be transmitted to member 3.

It will be seen that different speed ratios may be obtained by varying the proportions of balls 35 and the raceways on which they travel. Further movement of lever 10 will effect the disengagement of second-speed and engagement of high speed which is automatically locked the same as the first and second speeds. The teeth 24 and 25 are provided with inclined faces to assure an easy engagement of the high speed clutch 26 when lever 21 is thrown over in obtaining high speed. In order to obtain reverse speed, lever 10 is moved counter-clockwise a short distance beyond neutral when ball 13 will snap into the reverse recess, as shown in Fig. 2. The cam 20 will now be in operative engagement with the second-speed shift lever 19, which, together with the action of lever 22, will effect a disposition of parts, as shown in Fig. 3. The reverse speed thus obtained has less velocity than first-speed. It will be noted that the spacing of raceways 27 and 28 and also of raceways 39 and 40 is sufficient to permit of the proper clearances in changing speeds.

In the modified form of transmission mechanism, shown in Figs. 8 and 10, the reverse speed is eliminated, this design forming the counter-shaft of a motor-cycle. A driving sprocket 71 and a driven sprocket 72 are provided, sprocket 71 being secured to member 2 which differs but slightly from member 2, shown in Fig. 1. Ball thrust bearings 73 and radial bearings 74 are provided instead of bearings shown in Fig. 1. A central shaft 75 is similar to shaft 1, in Fig. 1, in that it floats in member 2, but differs therefrom due to the rigid connection thereof with the driven member 76 which in this case is provided with the teeth 31. The two parts of casing 6 are secured together by radial screws 77, as shown in Fig. 8. The operating handle 10' is formed integral with shaft 9 and may be slipped through the bearing of bracket 7 before the latter is spot-welded or otherwise secured to the casing 6. Cam-groove 78 is similar to but shorter than groove 23, there being no provision for a reverse lever in this design. Peripheral recesses 79 in disk 11 are provided for the same purpose as recesses 14, shown in Fig. 2. And, with the exception of the reverse, the operation is similar to that of the transmission mechanism shown in Fig. 1.

In the two-speed transmission mechanism, shown in Fig. 9, sprockets 71 and 72 are provided as in Fig. 8. Sprocket 71 is secured to driving member 80 which is provided with radial driving teeth 81 adapted to mesh with internal teeth 82 of the ball separator 83. The latter is longitudinally slidable and splined, by means of teeth 84 fitted to grooves 85, to the driven member 86. Pivotal screws 87 projecting radially from the non-rotatable ball raceway 91 pass through diametrically opposite holes 88 in the annular portion 89'' of lever 89, the screws 87 having a mounting similar to screws 53 and the same relation to lever 89 as screws 53 to lever 22. In other words, a central section taken at right angles to the section shown in Fig. 9 will show the screws 87 disposed in the same manner as screws 53 in Fig. 3. The separator 83 is free to turn within raceway 91, and in order to hold these two parts together, a snap-ring or retaining collar 90 is provided, as clearly shown in Fig. 9. A bifurcated end 92 of lever 89 is disposed between collars 93 of an operating screw 94 having a knurled head 95. A lug 96 integral with casing 6 carries screw 94 and also an adjusting screw 97 which limits the movement of screw 94, a lock-nut 98 being provided on screw 97, as shown in Fig. 9. The lever 89 projects through a guide slot 99 formed in casing 6, and through which a lubricant may be introduced to the internal operating parts of the device. A reduced portion 100 of the driven member 86 is journaled in driving member 80 in the same manner as shaft 1 in member 2 of Fig. 1.

In operation, screw 94 is turned until stopped by screw 97 for obtaining first-speed, the second or high-speed being obtained by turning screw 94 to the limit of its movement in the opposite direction. As soon as the raceway 91 is operatively disengaged from balls 35 the device becomes neutral and will remain so until teeth 81 and 82 engage, whereupon a direct connection between sprockets 71 and 72 is effected. The driving raceway 28 carried by the driving member 80 produces the first-speed in this device, which corresponds to second-speed in Fig. 3.

The two-speed transmission mechanism incorporated in the rear hub of a motor-cycle comprises a hub-shell 101 rotatably mounted on a stationary axle 102, which forms a part of the motor-cycle frame 103. A sprocket 104 is provided with an internal flange 105 and lateral flanges 106 and 107. A radial ball-bearing having an outer raceway 108 pressed into the flange 107 and an inner raceway 109 mounted on one end of hub-shell 101 is provided with bearing balls 108′ which are interposed between said raceways. This ball-bearing is capable of thrust as well as radial stresses and serves to maintain sprocket 104 in proper position when running idle and during engagement of the low speed operating parts. The raceways 109 and 108 are retained in their respective positions by means of snap rings 110 and 111, respectively. A driving raceway 112 is pressed into flange 106 against flange 105, and a non-rotatable race way 113 slidably mounted on the axle 102 is adapted to engage and disengage balls 114 interposed between said raceways. The balls 114 are spaced by means of a plurality of teeth 115 of a ball separator 116 which surrounds axle 102. Provided at one end of separator 116 is a plurality of teeth 117, there being web portions 117′ which reinforce and connect teeth 115 and 117. The separator 116 is mounted on a sleeve 118 and is adapted to rotate freely thereon, said sleeve being non-rotatable, but capable of longitudinal movement on axle 102. The raceway 113 is pressed over one end of sleeve 118, the latter being flanged at either end to maintain raceway 113 adjacent the separator 116. Projecting inwardly from hub-shell 101 is a plurality of teeth 119, as clearly shown in Figs. 11 and 14. The teeth 120 projecting inwardly from flange 105 are similar in formation to teeth 119 except that they are shorter, the difference in length being shown in Fig. 11, where the inner ends of teeth 119 are indicated by dotted lines.

An exposed end of raceway 113 is provided with diametrically opposite recesses 121 which are shown in Figs. 11 and 12. Arranged adjacent the recesses 121 is a retaining ring 122, which is secured in flange 106 for excluding foreign matter from the internal parts. Bifurcated ends 121′ of a bell-crank 123 are projected into recesses 121 for holding raceway 113 against rotation, said bell-crank being hinged to the frame 103, as shown in Figs. 11 and 12. The free arm of bell-crank 123 is pivoted to an operating-rod 124 which extends forwardly to a convenient point in the frame 103. The rings 110, 111 and 122 are similar to an ordinary ball retainer 125, which is of well known construction.

The speed shifting device comprises a threaded lug 126 having a stem 127 which is secured in frame 103 by means of a nut 129, as indicated in Fig. 12. A knurled collar 130 is provided on operating rod 124 for turning the same, said rod being screwed into lug 126 against an adjusting screw 131 having a lock-nut 132. In operation, the first or low speed is obtained when the parts are disposed, as shown in Figs. 11 and 12. The balls 114 being in operative engagement with raceways 112 and 113 will actuate separator 116 which drives the hub through the medium of webs 117′ and teeth 119 in mesh therewith. To obtain neutral, collar 130 is turned until bell-crank 123 assumes the intermediate dotted position, which action disengages balls 114 from raceways 112 and 113. Further turning of collar 130 will effect the meshing of teeth 117 with teeth 119 and 120, thus direct-connecting sprocket 104 with hub-shell 101 and producing high speed.

It will be noted that each rotatable ball separator described in the foregoing mechanisms is the primary member driven by the balls in relation therewith when a low speed is produced; and that said balls, and also the reverse balls, when forced into contact with their respective raceways, perform clutching as well as speed reducing functions.

The interposition of only a single race of balls between the driving and driven member for producing intermediate and low speeds in the 3-speed mechanisms results in direct driving action and equal efficiency for both speeds; and the high efficiency attained under heavy pressure is due to the liberal size of the balls employed, which of necessity must be large to produce standard speed ratios.

While I have illustrated and described the preferred forms of construction for carrying my invention into effect, these are capable of variations and modifications without departing from the spirit of my invention. I, therefore, do not wish to be limited to the precise details of construction set forth, but desire to avail myself of such variations and modifications as come within the scope of the appended claims.

What I claim as new is:—

1. In a transmission mechanism, a driving ball raceway and a non-rotatable raceway co-axial therewith, balls in operative engagement with said raceways, controllable means for releasing said balls, a ball separator, and a driven member in operative connection with said separator disposed coaxially with said driving raceway.

2. In a transmission mechanism, a driving ball raceway and a non-rotatable axially movable ball raceway co-axial therewith, a plurality of balls in operative engagement with said raceways, controllable means for moving said non-rotatable raceway axially, said balls being released by axial movement of said non-rotatable raceway in one direction, a ball separator, and a driven shaft in operative connection with said separator disposed coaxially with said driving raceway.

3. In a transmission mechanism, a driving ball raceway and a non-rotatable ball raceway disposed co-axially therewith, a plurality of balls interposed between said raceways, means for moving said non-rotatable raceway axially, said balls being engaged by said raceways when said non-rotatable raceway is moved axially in one direction and released therefrom when moved in the other direction, a ball separator, and a driven shaft in operative connection with said separator disposed co-axially with said driving raceway.

4. In a transmission mechanism, a driving ball raceway and a non-rotatable ball raceway disposed co-axially therewith, a plurality of balls interposed between said raceways and adapted to roll thereon, means for moving said non-rotatable raceway axially, said balls being operatively engaged by said raceways when said non-rotatable raceway is moved axially in one direction and released by a reverse movement, a ball separator in operative engagement with said balls, and a driven member in axial alinement with said driving raceway operatively connected with said separator.

5. In a transmission mechanism, a mounted driving ball raceway and a non-rotatable axially movable raceway disposed co-axially therewith, a series of balls interposed between said raceways, the contour of the latter being such that when said non-rotatable raceway is moved axially in one direction said balls engage said raceways and when moved in the other direction said balls are released, means for moving said non-rotatable raceway axially, and means for locking the same in engagement with said balls, a ball separator in operative connection with said balls, and a driven shaft in operative connection with said separator disposed coaxially with said driving raceway.

6. In a transmission mechanism, a driving ball raceway and a non-rotatable ball raceway co-axial therewith, a series of balls interposed between said raceways, means for moving said non-rotatable raceway axially, the ball contacting surfaces of said raceways being inclined to the axes thereof and the construction being such that when said non-rotatable raceway is moved in one direction said balls engage said raceways and when moved in the other direction said balls are released, a ball separator in operative engagement with said balls, and a driven member in operative connection with said separator disposed co-axially with said driving raceway.

7. In a transmission mechanism, a driving member and a pair of concentric driving ball raceways carried thereby, a pair of concentric non-rotatable raceways, means for moving the outer non-rotatable raceway axially, and means for moving the inner non-rotatable raceway axially, a series of balls adapted to roll on either the outer driving raceway and inner non-rotatable raceway when moved axially into operative engagement therewith, or the inner driving raceway and outer non-rotatable raceway when moved axially into operative engagement therewith, a ball separator in operative connection with said balls, and a driven member in operative connection with said separator disposed co-axially with said driving raceways.

8. In a transmission mechanism, a driving member and a pair of concentric driving ball raceways carried thereby, a pair of concentric non-rotatable raceways, means for moving the outer non-rotatable raceway axially and means for moving the inner non-rotatable raceway axially, a series of balls adapted to roll on either the outer driving raceway and inner non-rotatable race-way when moved into operative engagement therewith, or the inner driving raceway and outer non-rotatable raceway when moved into operative engagement therewith, means for locking said inner non-rotatable raceway in engagement with said balls and means for locking said outer non-rotatable raceway in engagement with said balls, a ball separator in operative connection with said balls, and a driven member in operative connection with said separator disposed co-axially with said driving raceways.

9. In a transmission mechanism, a driving member and a pair of concentric driving ball raceways carried thereby, a pair of concentric non-rotatable raceways, a plurality of balls adapted to engage either the outer driving raceway and inner non-rotatable raceway or the inner driving raceway and outer non-rotatable raceway, means for moving said outer non-rotatable raceway axially for engaging or disengaging said balls and means for moving said inner non-rotatable raceway axially for engaging or disengaging said balls, a ball separator in operative connection with said balls, a driven member in operative connection with said separator disposed co-axially with said driving member, and means for connecting said driven member with said driving member when said non-rotatable raceways are disengaged from said balls.

10. In a transmission mechanism, a driving member, and a pair of concentric driving raceways secured thereto, a pair of concentric non-rotatable raceways, a row of balls for said raceways, said balls being adapted to operatively engage either the outer driving raceway and inner non-rotatable raceway when moved axially in one direction or the inner driving raceway and outer non-rotatable raceway when moved axially in one direction, means for moving each non-rotatable raceway axially for engaging and disengaging said balls, a ball separator disposed between the inner driving raceway and the inner non-rotatable raceway and operatively engaged with said balls, and a driven member in operative connection with said separator adapted to have operative connection with said driving member.

11. A transmission mechanism comprising a rotatable driving member and a pair of concentric driving raceways secured thereto; a pair of concentric non-rotatable raceways and means for moving each axially; a row of balls for said raceways; said balls being adapted to operatively engage either the outer driving raceway and inner non-rotatable raceway when moved axially in one direction, or the inner driving raceway and outer non-rotatable raceway when moved axially in one direction, said balls being released by a reverse movement of said non-rotatable raceways, a ball separator arranged between the inner non-rotatable raceway and inner driving raceway and engaged with said balls; a plurality of teeth on said driving member; and a driving member in operative connection with said separator adapted to have operative connection with the teeth of said driving member.

12. A transmission mechanism comprising a rotatable driving member and a pair of concentric driving raceways secured to the inner face thereof; a plurality of teeth provided on the inner face of said driving member and disposed inside the inner driving raceway; a driven hub provided on the outer face of said driving member; a pair of concentric non-rotatable raceways and means for moving each axially; a single row of balls for said raceways; said balls being adapted to operatively engage either the outer driving raceway and inner non-rotatable raceway when moved axially in one direction, or the inner driving raceway and outer non-rotatable raceway when moved axially in one direction; said balls being released by a reverse movement of said non-rotatable raceways, a ball separator arranged between the inner driving raceway and inner non-rotatable raceway and adapted to be driven by said balls; a driven member; and a member in splined connection with said separator and operatively connected with said driven member having a toothed end for engaging and disengaging the teeth of said driving member.

13. A transmission mechanism comprising in combination, a driven member and speed transmission balls in operative relation therewith, means for maintaining said balls normally idle or floating in such relation, and means for driving said balls.

14. A transmission mechanism comprising in combination, a driving member and a driven member, normally idle or floating speed transmission balls arranged in operative relation to said driven member, and controllable means for forcing said balls into rolling contact with said driving member.

15. A ball transmission mechanism comprising in combination, a driving member and low speed transmission balls adapted to roll thereon, a driven member in which said balls are rotatably mounted, and means for maintaining said balls idle and against rolling contact.

16. A ball transmission mechanism comprising in combination, a driving member and a driven member, balls in permanent operative relation to said driven member, and means for maintaining said balls normally idle, whereby said balls may be controllably forced into contact with said driving member.

17. A transmission mechanism comprising a driving raceway and a driven member, normally idle balls arranged in operative relation to said driven member, and controllable means adapted to force said balls into contact with said raceway.

18. A transmission mechanism comprising a rotary driving raceway and a rotatable driven member, a plurality of normally idle balls in permanent operative relation to said driven member, and means adapted to move said balls into and out of rolling contact with said raceway.

19. A transmission mechanism comprising a rotary driving raceway and a coaxial rotatable driven member, a circular row of normally idle balls mounted in operative relation to said driven member, and controllable means for forcing said balls into rolling contact with said raceway.

20. A transmission mechanism comprising a rotary driving raceway and a rotatable driven member in axial alinement therewith, a row of normally idle balls loosely inserted in said driven member, and controllable means adapted to force said balls into contact with said raceway.

21. A transmission mechanism comprising a rotary driving raceway and a coaxial rotatable driven member having peripheral recesses, a plurality of balls mounted in said recesses and normally floating therein, and controllable means adapted to force said balls into contact with said raceway, whereby said balls perform clutching and speed reducing functions.

22. A transmission mechanism comprising a driving raceway and a driven member, balls adapted to actuate said driven member and arranged in permanent operative relation therewith, and means for forcing said balls into contact with said raceway and for releasing said balls.

23. A transmission mechanism comprising a plurality of normally idle balls, a driving raceway, a non-rotatable raceway, controllable means for effecting a contact of said balls with said raceways, and a driven member adapted to be actuated by said balls and forming a separator therefor.

24. A transmission mechanism comprising a rotary driving member and a rotatable driven member adapted to be connected therewith for producing high speed, balls in operative relation to said driven member and moving idly therewith during high speed, means for breaking the high speed connection, a driving raceway on said driving member, and means for forcing said balls into contact with said raceway for imparting a low speed to said driven member.

25. A transmission mechanism comprising a driving member, and a plurality of concentric raceways carried thereby, a driven member and a plurality of normally idle balls loosely inserted therein, and controllable means for successively forcing said balls into rolling contact with said raceways for producing different low speeds.

26. A transmission mechanism comprising a driving member and a pair of concentric raceways carried thereby, a driven member and normally idle balls in operative relation therewith, and means for controllably forcing said balls into contact with either of said raceways for producing low speeds.

27. A transmission mechanism comprising a rotary driving member and a pair of concentric raceways secured thereto, a rotatable driven member and normally idle balls mounted thereon, and means for controllably forcing said balls into contact with either of said raceways.

28. A transmission mechanism comprising a driving member having a pair of concentric contact surfaces, a driven member and normally idle balls in operative relation therewith, means for making said balls contact with the larger surface of said driving member for producing a low speed, and means for making said balls contact with the other surface for producing a lower speed.

29. A transmission mechanism comprising a driving member and a driven member adapted to be connected therewith for producing high speed, balls in operative relation to said driven member and moving idly therewith during high speed, means for breaking the high speed connection, a pair of concentric raceways on said driving member, and controllable mechanism for forcing said balls into contact with either of said raceways for producing different low speeds.

30. A transmission mechanism comprising a driving member having teeth and a pair of concentric driving raceways on a face thereof, a lever-operated slidable clutch member arranged coaxially with said driving member and having teeth adapted to engage the teeth thereof, a driven member splined to said clutch member and a row of balls loosely mounted on said driven member, a pair of lever-operated non-rotatable concentric raceways arranged to move axially for moving said balls, said balls being adapted to engage the outer driving raceway when moved by the inner non-rotatable raceway, and the inner driving raceway when moved by the outer non-rotatable raceway, a rotatable control member having a cam slot in engagement with the lever of said clutch member and a peripheral cam adapted to actuate the levers of said non-rotatable raceways, and a final driven member connected with said clutch member.

31. A transmission mechanism comprising a driving member and a driven member, normally idle balls in operative relation with said driven member and means for forcing said balls into contact with said driving member, a reverse speed driving raceway connected with said driven member, a final driven member and a driven raceway carried thereby, normally idle balls interposed between said raceways and stationary mounting means therefor, and means for forcing a contact of said last named balls with said raceways.

32. A transmission mechanism comprising a driving member and a driven ball separator, normally idle balls mounted in said separator and means for forcing said balls into contact with said driving member, a driven member and a driven raceway secured thereto, a slidable clutch member permanently connected with said separator and normally in toothed connection with said driven member, a reverse speed driving raceway on said clutch member, normally idle reverse balls interposed between said raceways and stationary mounting means therefor, and means for moving said clutch member out of connection with said driven member, the construction being such that such movement of said clutch member will force said reverse balls into contact with said raceways.

33. A transmission mechanism comprising a stationary casing, a driving member and a driven member journaled in said casing, a central shaft journaled in said members and serving as a spacing means therefor, a high speed clutch and a reverse speed clutch slidably mounted on said shaft, said clutches being in permanent connection and capable of independent movement, means for moving said high speed clutch into and out of engagement with said driving member, means for moving said reverse clutch into and out of engagement with said driven member, a ball separator splined to said high speed clutch, normally idle balls mounted on said separator, two concentric driving raceways carried by said driving member, two concentric non-rotatable raceways and means for axial movement thereof, said non-rotatable raceways being adapted to force said balls into contact with said driving raceways, a reverse driving raceway on said reverse speed clutch, a driven raceway secured to said driven member, and normally idle reverse balls and stationary mounting means therefor, the construction being such that when said reverse clutch is disengaged from said driven member, said reverse balls will contact with said reverse driving and driven raceways.

34. A transmission mechanism comprising a driving raceway and a non-rotatable axially movable raceway, balls normally free from pressure interposed between said raceways, a driven member in operative relation with said balls, a casing surrounding said raceways, a controllable lever pivoted in one side of said casing and projecting through the opposite side thereof, and means for connecting said lever with said non-rotatable raceway, whereby the latter is held against rotation, said lever being also capable through the medium of said connection of forcing said non-rotatable raceway into operative contact with said balls.

35. A transmission mechanism comprising a driving raceway and a non-rotatable axially movable raceway, balls normally free from pressure interposed between said raceways, a driven member in operative relation with said balls, a casing surrounding said raceways, a controllable lever pivoted in one side of said casing and projecting through the opposite side thereof, there being diametrically opposite lateral recesses in said non-rotatable raceway disposed in an axial plane substantially perpendicular to said lever, and teeth on said lever engaging said recesses, whereby a uniform pressure is transmitted to said balls when said lever is moved in one direction.

In witness whereof I have hereunto set my hand this 24th day of December, 1915.

WILLIAM COBB SMITH.

Witnesses:
FLORENCE MITCHELL,
GEO. M. STACK.

Copies of this patent may be obtained for five cents each, by addressing the "Commissioner of Patents, Washington, D. C."